United States Patent [19]

Majima

[11] Patent Number: 5,369,515
[45] Date of Patent: Nov. 29, 1994

[54] NODE FOR LOOP-TYPE OPTICAL LAN AND A LOOP-TYPE OPTICAL LAN USING THE SAME

[75] Inventor: Masao Majima, Isehara, Japan

[73] Assignee: Canon Kabushiki Kaisha, Tokyo, Japan

[21] Appl. No.: 979,076

[22] Filed: Nov. 19, 1992

[30] Foreign Application Priority Data

Nov. 25, 1991 [JP] Japan .................. 3-335759

[51] Int. Cl.$^5$ ............................................. H04J 14/00
[52] U.S. Cl. ................................. 359/125; 359/119; 370/85.5
[58] Field of Search ............... 359/125, 124, 126, 133, 359/118, 119, 127, 164; 370/71, 73, 76, 85.5

[56] References Cited

U.S. PATENT DOCUMENTS

| | | | |
|---|---|---|---|
| 3,986,020 | 10/1976 | Kogelnik | 250/199 |
| 4,244,045 | 1/1981 | Nosu et al. | 370/3 |
| 4,592,043 | 5/1986 | Williams | 359/126 |
| 4,900,119 | 2/1990 | Hill et al. | 350/96.15 |
| 4,932,742 | 6/1990 | Tohme | 359/137 |
| 5,010,543 | 4/1991 | Hill | 370/3 |
| 5,130,835 | 7/1992 | Stegmeier | 359/124 |
| 5,173,794 | 12/1992 | Cheung et al. | 359/127 |
| 5,289,302 | 2/1994 | Eda | 359/123 |

FOREIGN PATENT DOCUMENTS 0294133 12/1988 European Pat. Off.
0362789 4/1990 European Pat. Off.

OTHER PUBLICATIONS

Eda et al., "A Proposal on a Hybrid Local Area Network System w/Optical Fiber Cable Using Photonic WDM Technique," SB-6-6 Vernal Meeting of Electronics Information Communication Academy (1991).

Warzanskyj, et al., "Polarization-Independent Electro-Optically Tunable Narrow-Band Wavelength Filter," Appl. Phys. Lett., vol. 53, No. 1, Jul. 4, 1988.

Steven Moustakas, "The Standardization of IEEE 802.3 Compatible Fiber Optic CSMA/CD Local Area Networks: Physical Topologies," IEEE Communications Magazine, vol. 25, No. 2, Feb., 1987, New York, pp. 22–29.

Peter Cochrane, et al., "Eradicating the Central Office With Coherent Optical Technology," 1988 International Zurich Seminar on Digital Communications, Mar. 8–10, 1988, pp. 59–62, Zurich, Switzerland.

Primary Examiner—Herbert Goldstein
Assistant Examiner—Richard A. Moller
Attorney, Agent, or Firm—Fitzpatrick, Cella, Harper & Scinto

[57] ABSTRACT

A node for a loop type optical LAN using wavelength division multiplexing includes a light branching device for partially branching light from a loop of the optical LAN and a tunable filter for filtering a signal having a desired wavelength from the light branched by the branching device. The node may further include a light source for transmitting a signal to a loop of the optical LAN, an optical demultiplexer for selecting from the loop light having the same wavelength as the signal transmitted by the light source and an absorbing device for absorbing the entire amount of the signal transmitted by the light source after the signal once circulates the loop and is selected from the loop by the optical demultiplexer.

14 Claims, 6 Drawing Sheets

NODE FOR LOOP-TYPE OPTICAL LAN AND A LOOP-TYPE OPTICAL LAN USING THE SAME

BACKGROUND OF THE INVENTION

1. Field of the Invention

The present invention relates generally to a node for an optical communication network, and more specifically to a loop-type optical local area network (LAN) and a loop-type optical LAN using such a node.

2. Related Background Art

In conventional loop-type optical LANs, there have been proposed apparatuses with transmission speeds of several hundred Mbps which serve as a backbone LAN of Ethernet, token ring and the like. In these products, an increase in capacity is achieved mainly by time division multiplexing (TDM), but wavelength division multiplexing (WDM) is also being studied as a means for achieving multimedia communications. As an example of the wavelength division multiplexing system, a compound-type optical LAN has been proposed by Eda et al. (see SB-6—6 Vernal Meeting of Electronics Information Communication Academy (1991)). FIG. 1 shows the system structure of this LAN, and FIG. 2 shows the structure of a node used in the LAN. This system is constructed by the combination of FDDI (fiber distributed data interface) optical LAN and wavelength division multiplexing communication in which a plurality of wavelengths are utilized and no regenerative repeating is conducted. It should be noted that the term "wavelength" as used herein also means a signal or light having such a wavelength.

A wavelength $\lambda_4$ of the multiplexed wavelengths is assigned for FDDI, and wavelengths of $\lambda_1 \sim \lambda_n$ are assigned for wavelength division multiplexing communication. In FIG. 1, reference numeral 14 designates a control node for performing group or centralized management and control of the wavelength division multiplexing communication, reference numerals 15-1~15-3 respectively designate communication nodes which do not have such function, and reference numerals 13-1~13-4 respectively designate optical fibers used as a transmission line. The wavelength $\lambda_4$ for FDDI is regeneratively repeated in each node including the control node 14 and continues to circulate in the loop (in a counterclockwise direction in FIG. 1). On the other hand, the wavelengths $\lambda_1 \sim \lambda_n$ for communication are caused to enter the loop by the node that transmits such wavelength and are extracted from the loop in the node that receives such wavelength. FIG. 1 shows a state in which the node 15-1 conducts the communication using the wavelength $\lambda_1$ and the node 15-2 conducts the receiving thereof. In this communication system, the wavelength is extracted or picked out from the loop when received, so the wavelength $\lambda_1$ exists solely in the optical fiber 13-2 between the transmitting node 15-1 and the receiving node 15-2.

The operation of the node will be described with reference to FIG. 2.

In FIG. 2, reference numeral 1-1 designates an optical demultiplexer for extracting or selecting an access-control signal of the wavelength $\lambda_4$ for FDDI, reference numeral 2 designates a tunable optical demultiplexer which can control or change an extracted wavelength, reference numerals 3-1 and 3-2 respectively designate optical multiplexers for combining a plurality of wavelengths, reference numerals 6-1 and 6-2 respectively designate opto-electric (O/E) converters for converting an optical signal to an electric signal, reference numeral 7 designates an access processing circuit for controlling the entire node concerned, reference numeral 8-1 designates an electro-optical (E/O) converter for converting an electric signal to an optical signal, reference numeral 10 designates a tunable E/O converter in which the wavelength of an optical signal to be converted from an electric signal is changeable, and reference numeral 12 designates an interface circuit for outputting a signal from a terminal equipment for performing the wavelength division multiplexing communication (not shown) into the tunable E/O converter 10 and inputting a signal from the O/E converter 6-2 in the associated node into the terminal equipment.

For simplicity of explanation, it is assumed that the node shown in FIG. 2 conducts the transmission at a wavelength $\lambda_1$ and the receiving at a wavelength $\lambda_2$ during wavelength division multiplexing communication and that a wavelength $\lambda_3$ is also on the transmission line. In FIG. 2, the wavelengths transmitted through respective portions of the node are designated together with an arrow. The wavelength $\lambda_1$ transmitted from this node is taken in by a receiving node and is not returned to the node shown in FIG. 2, so the wavelengths received by this node from the transmission line are $\lambda_4$, $\lambda_2$ and $\lambda_3$. The access-control signal wavelength $\lambda_4$ is separated from the other wavelengths by the optical demultiplexer 1-1, enters the O/E converter 6-1 for time division multiplexing communication and is converted to an electric signal to be supplied to the access processing circuit 7. The remaining wavelengths $\lambda_2$ and $\lambda_3$ are combined with the wavelength $\lambda_1$ carrying a signal from the tunable E/O converter 10 of the terminal equipment concerned, at the optical multiplexer 3-1.

The wavelength $\lambda_2$ to be received by this node is separated by the tunable optical demultiplexer 2 and input into the O/E converter 6-2. On the other hand, the other wavelengths $\lambda_1$ and $\lambda_3$ are combined with the access-control signal wavelength $\lambda_4$ transmitted from the E/O converter 8-1, at the optical multiplexer 3-2, and are transmitted to the transmission line.

The selection wavelengths of the tunable E/O converter 10 and the tunable optical demultiplexer 2 are controlled by the access processing circuit 7. In this case, the selection wavelength of the tunable E/O converter 10 is set to $\lambda_1$, and that of the tunable optical demultiplexer 2 is set to $\lambda_2$. Therefore, the tunable E/O converter 10 converts an electric signal from the interface circuit 12 to an optical signal having the wavelength $\lambda_1$, and this optical signal is combined with the other wavelengths $\lambda_2$ and $\lambda_3$ by the optical multiplexer 3-1, as discussed above. On the other hand, the light of the wavelength $\lambda_2$ taken out by the tunable optical demultiplexer 2 is converted to an electric signal by the O/E converter 6-2 and this electric signal is supplied to the interface circuit 12. As mentioned above, the interface circuit 12 inputs a signal from the terminal equipment for performing the communication in the wavelength division multiplexing system into the tunable E/O converter 10 in the node and outputs a signal from the O/E converter 6-2 into this terminal equipment. The interface circuit 12 is also controlled by the access processing circuit 7.

The prior art loop type optical LAN, however, has the following drawback. In the LAN, a case occurs where a simultaneous communication is performed, that is, a signal of a certain wavelength transmitted from a certain node is received by a plurality of nodes. In the wavelength division multiplexing communication of the loop type optical LAN, a node which first receives a signal of such a wavelength takes in all the light of this wavelength, so this wavelength cannot be transmitted to following nodes. As a result, in the wavelength division multiplexing communication of the above-discussed system, only one-to-one communication can be conducted.

SUMMARY OF THE INVENTION

It is an object of the present invention to provide a node for an optical communication network which enables simultaneous communication to a plurality of nodes and a loop type optical LAN using such a node.

According to one aspect of the present invention, a node for a loop type optical LAN using wavelength division multiplexing is provided which includes a light branching device for partially branching light from a loop of the optical LAN and a tunable filter for filtering a signal having a desired wavelength from the light branched by the branching device.

According to another aspect of the present invention, a node for a loop type optical LAN using wavelength division multiplexing is provided which includes a light source for transmitting a signal to a loop of the optical LAN, an optical demultiplexer for selecting from the loop light having the same wavelength as the signal transmitted by the light source and an absorbing device for absorbing the entire amount of the signal transmitted by the light source after the signal once circulates the loop of the optical LAN and is picked out from the loop by the optical demultiplexer.

According to yet another aspect of the present invention, a loop type optical LAN using wavelength division multiplexing is provided which includes a loop transmission line and a plurality of nodes. At least one of the nodes includes a light branching device for partially branching light from a loop of the optical LAN and a tunable filter for filtering a signal having a desired wavelength from the light branched by the branching device.

According to still another aspect of the present invention, a loop type optical LAN using wavelength division multiplexing is provided which includes a loop transmission line and a plurality of nodes. At least one of the nodes includes a light source device for transmitting a signal to the loop transmission line, an optical demultiplexer for selecting from the loop transmission line light having the same wavelength as the signal transmitted by the light source device and an absorbing device for absorbing the entire amount of the signal transmitted by the light source device after the signal once circulates the loop transmission line and is picked out from the loop transmission line by the optical demultiplexer.

These advantages and others will be more readily understood in connection with the following detailed description of the preferred embodiments in conjunction with the drawings.

DESCRIPTION OF THE PREFERRED EMBODIMENT

Figure 1:
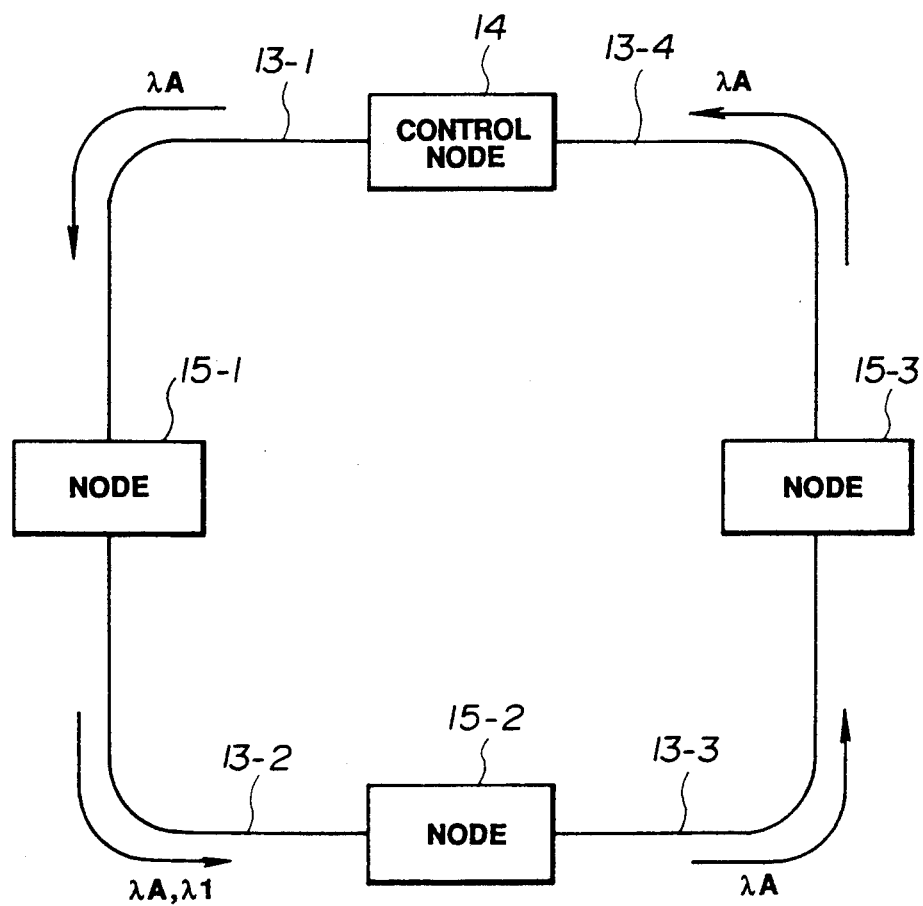
FIG. 1 is a schematic view showing the system structure of a prior art loop type optical LAN.
Figure 2:
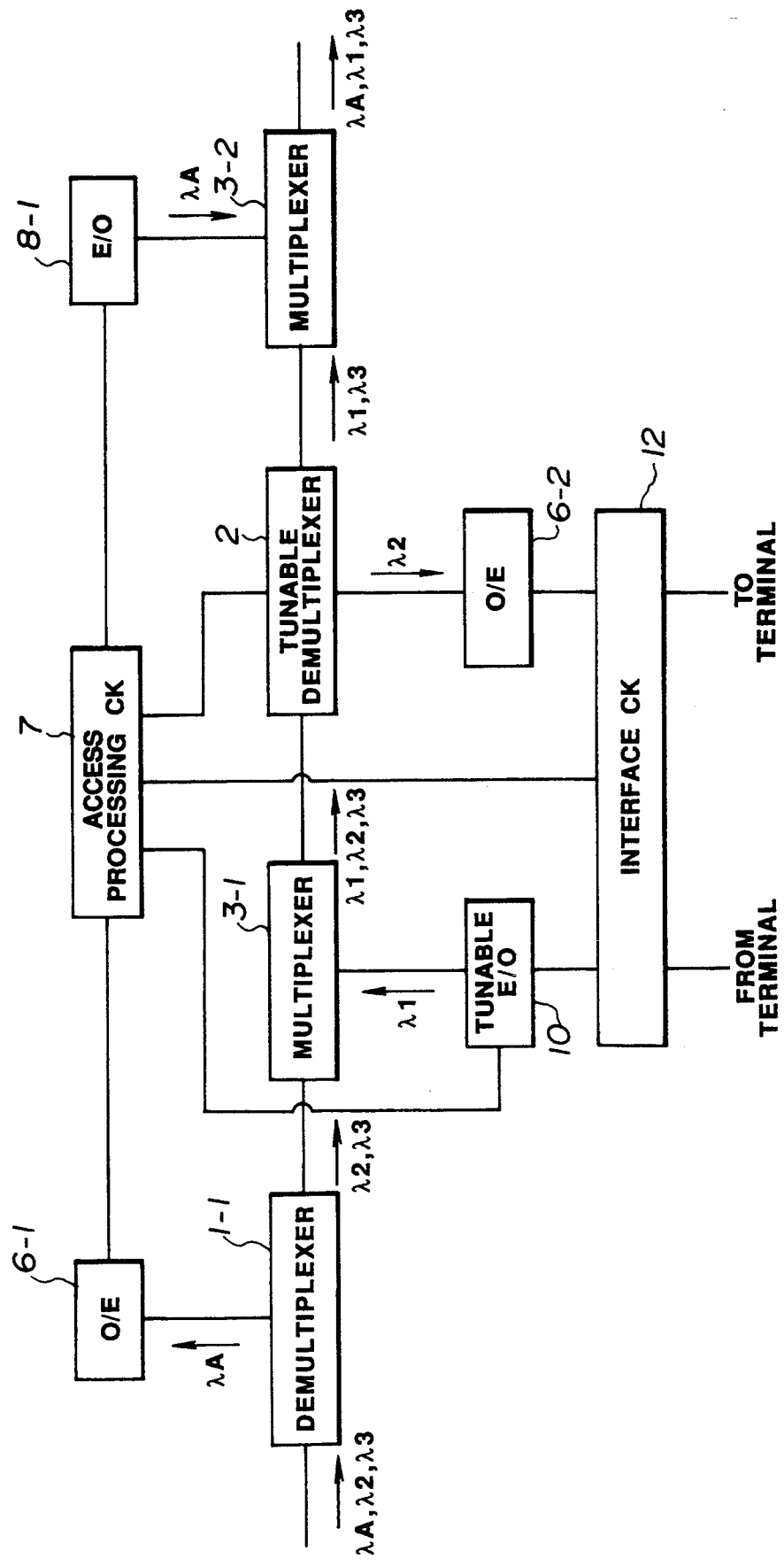
FIG. 2 is a block diagram showing the structure of a prior art node for a loop type optical LAN.
Figure 3:
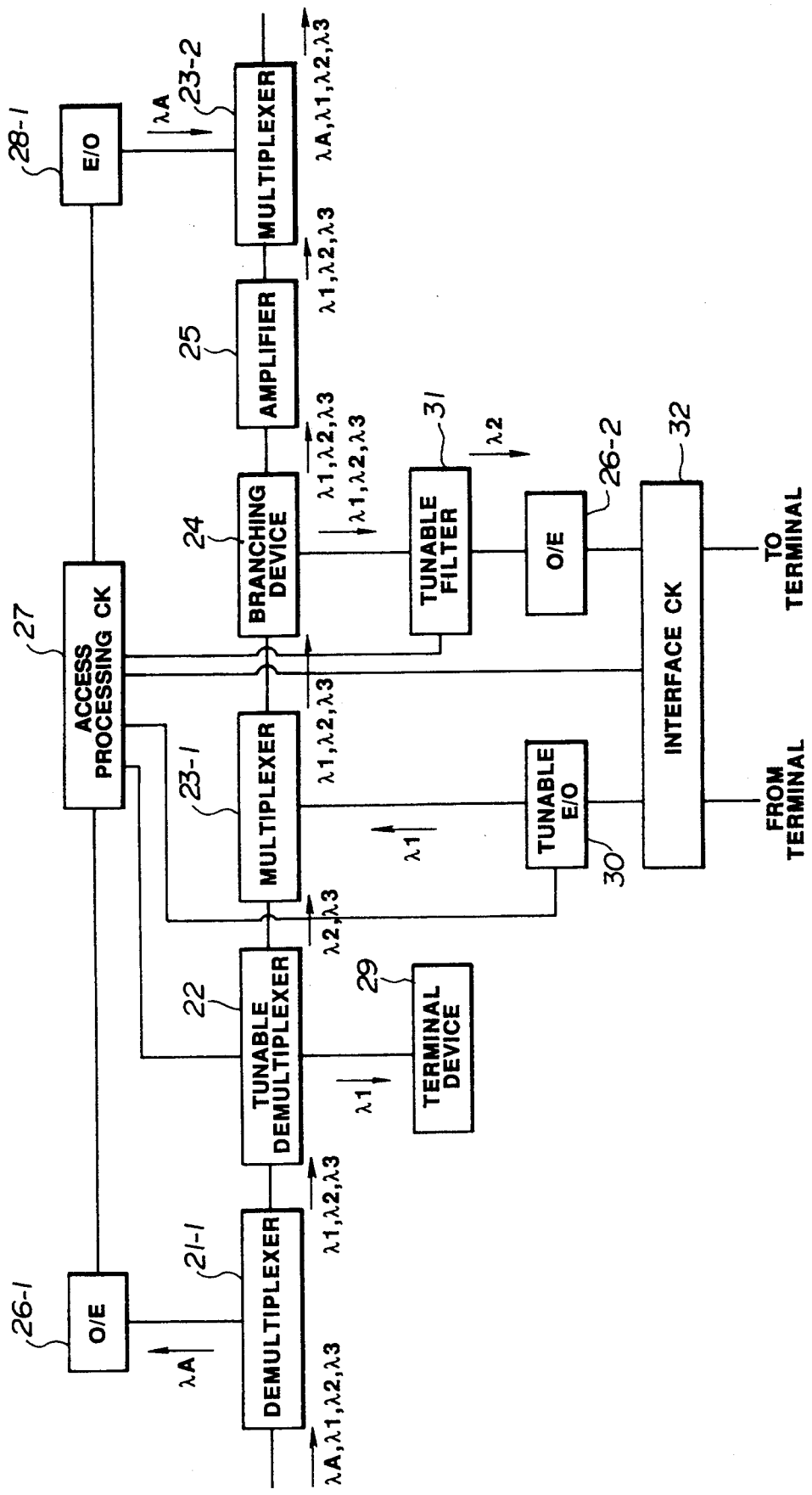
FIG. 3 is a block diagram showing the structure of a first embodiment of a node for a loop type optical LAN according to the present invention.
Figure 4:
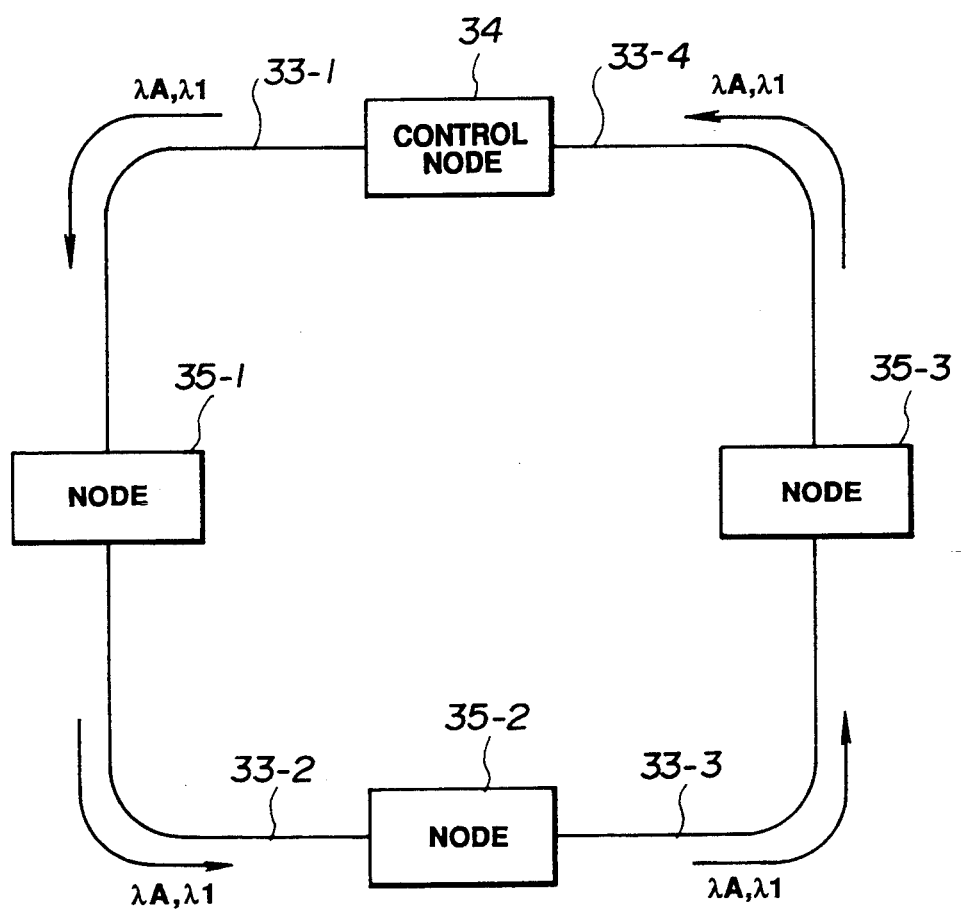
FIG. 4 is a schematic view showing the system structure of a first embodiment of a loop type optical LAN using the node shown in FIG. 3.

A preferred first embodiment of an optical node according to the present invention and a preferred first embodiment of a loop type optical LAN using the node of FIG. 3 will be described with reference to FIGS. 3 and 4. FIG. 3 shows the structure of the first embodiment of a node, and FIG. 4 shows the system structure of the first embodiment of a loop type optical LAN.

In the first embodiment, the number of the nodes is three, and the wavelength division multiplexing (WDM) communication in which regenerative repeating is not conducted in the node and time division multiplexing (TDM) communication in which a regenerative repeating is conducted in the node are compounded by WDM to construct a single LAN. The TDM communication performs a communication for an access control of data communication and the WDM multiplexing communication. On the other hand, the WDM communication is utilized for communications of data of a large capacity, such as video and so forth. A wavelength $\lambda_A$ is assigned to the TDM communication, and wavelengths $\lambda_1 \sim \lambda_3$ are assigned to the WDM communication. Further, the wavelength control of the WDM communication is performed by a control node 34.

In FIG. 3, reference numeral 21-1 designates an optical demultiplexer for separating the wavelength $\lambda_A$, reference numeral 22 designates a tunable optical demultiplexer which is capable of controlling a separation or selection wavelength, reference numerals 23-1 and 23-2 respectively designate optical multiplexers for combining light signals, reference numeral 24 designates a light branching device for obtaining a part of the amount of light by branching, reference numerals 26-1 and 26-2 respectively designate O/E converters for converting an optical signal to an electric signal, reference numeral 27 designates an access processing circuit for controlling the entire node concerned, reference numeral 28-1 designates an E/O converter for converting an electric signal to an optical signal, reference numeral 29 designates an optical terminal device for absorbing light, reference numeral 30 designates a tunable E/O converter in which the wavelength of an optical signal to be converted from an electric signal is changeable, reference numeral 31 designates a tunable filter in which the wavelength of a filtered light is changeable, and reference numeral 32 designates an interface circuit for receiving a signal from a terminal equipment (not shown) for performing a communication in the WDM communication into the tunable E/O converter 30 in the node and outputting a signal from the O/E converter 26-2 to the terminal equipment.

In this structure, a PIN photodiode is used as an opto-electric converting device of the O/E converters 26-1 and 26-2, a semiconductor laser is used as a light emitting device of the E/O converter 28-1 and a multi-electrode distributed Bragg reflector (DBR) semiconductor laser is used as a light emitting device of the tunable E/O converter 30 and the tunable filter 31. As the tunable optical demultiplexer 22, a device as disclosed in an article of Appl. Phys. Lett. Vol. 53 No. 1 pp. 13-15 written by W. Warzanskyj et al. is preferably used.

In FIG. 4, reference numerals 33-1~33-4 respectively designate optical fibers which function as a transmission line, reference numeral 34 designates a control node for performing the control of the WDM communication and reference numerals 35-1~35-3 respectively designate nodes for conducting the data communication in this system.

The operation of the first embodiment will be described with reference to FIG. 3. The access processing circuit 27, the O/E converter 26-1 and the E/O converter 28-1 are provided for the TDM communication. Various communication protocols which are suitable for a loop type LAN such as FDDI are applicable. The tunable optical demultiplexer 22, the tunable E/O converter 30, the tunable filter 31, the O/E converter 26-2 and the interface circuit 32 are provided for the WDM communication. This node is adapted for a loop type, so an optical signal is transmitted in a single direction. In FIG. 4, the signal is transmitted from left to right. For simplicity of explanation, the node conducts the transmission at the wavelength of $\lambda_1$ in the WDM communication, and conducts the receiving at the wavelength of $\lambda_2$. Further, the other wavelength $\lambda_3$ is also on the transmission line. In FIG. 3, the wavelengths transmitted through respective portions of the node are indicated together with an arrow.

The wavelength $\lambda_4$ of light signals incident on the node from the transmission line is separated from the light signals of the other wavelengths by the optical demultiplexer 21-1 to be incident on the O/E converter 26-1 for the TDM communication, and is converted to an electric signal to be input into the access processing circuit 27. The light signals of the other wavelengths $\lambda_1 \sim \lambda_3$ are input into the tunable optical demultiplexer 22. The tunable optical demultiplexer 22 is controlled by the access processing circuit 27 so that the demultiplexer 22 can separate the light signal of the same wavelength (in this case, $\lambda_1$) as the wavelength of a light signal emitted from the tunable E/O converter 30 in the node concerned. The separated light signal of the wavelength $\lambda_1$ is absorbed by the optical terminal device 29. The light signals of the remaining wavelengths $\lambda_2$ and $\lambda_3$ are combined with a light signal of the wavelength $\lambda_1$ from the tunable E/O converter 30 carrying a signal of the associated terminal, at the optical multiplexer 23-1. A part of the light signals of the wavelengths $\lambda_1 \sim \lambda_3$ are picked out by the light branching device 24 for receiving. The remaining light signals are amplified by the optical amplifier 25, and combined with the access-control light signal of the wavelength $\lambda_4$ supplied from the E/O converter 28-1 by the optical multiplexer 23-2 to be transmitted to the transmission line. The wavelengths of the tunable E/O converter 30 and the tunable filter 31 are controlled by the access processing circuit 27. In this example, the wavelength of the tunable E/O converter 30 is set to $\lambda_1$, and that of the tunable filter 31 is set to $\lambda_2$. The tunable E/O converter 30 converts an electric signal supplied from the interface circuit 32 to an optical signal of the wavelength $\lambda_1$, and this optical signal is combined with the other light signals by the optical multiplexer 23-1, as explained above. Only the light signal of the wavelength $\lambda_2$ of the light signals picked out by the light branching device 24 is transmitted through the tunable filter 31, and is converted to an electric signal by the O/E converter 26-2 to be supplied to the interface circuit 32. The interface circuit 32 is controlled by the access processing circuit 27, and performs the interconnection between the terminal equipment to which the associated node is connected and the tunable E/O converter 30 and the O/E converter 26-2.

The communication utilizing the WDM system is conducted in the following manner.

The access processing circuit 27 demands WDM communication from the control node 34 through the TDM communication. When receiving the demand of the WDM communication, the control node 34 checks a vacant wavelength and notifies the demanding node of a designated wavelength through the TDM communication. The access processing circuit 27 which is informed of the designation of the wavelength adjusts the wavelengths of the tunable O/E converter 30 and the tunable optical demultiplexer 22 in the associated node to the designated wavelength. After that, the access processing circuit 27 sends the designated wavelength to a node which will be a receiving addressed node in the WDM communication, through the TDM communication. Then, the access processing circuit 27 controls the interface circuit 32 so that the tunable E/O converter 30 can transmit a light or optical signal at the designated wavelength.

The loop type optical LAN using the first embodiment of the node will be described with reference to FIG. 4.

As discussed above, the TDM and WDM communications are compounded in this LAN, and the WDM communication is controlled by the TDM communication. The control node 34 performs the management and control of the WDM communication. In order to explain the state of communication in the LAN, it is assumed that the node 35-1 conducts the communication at the wavelength $\lambda_1$ and the nodes 35-2 and 35-3 receive a signal at this wavelength. The direction of optical signal transmission in the loop is assumed to be counterclockwise.

The signal of the wavelength $\lambda_4$ for the TDM communication is always transmitted in the counterclockwise direction in the loop because this signal is regeneratively repeated in each node (including the control node 34). In contrast, the signal of the wavelength $\lambda_1$ is absorbed in the node 35-1 after this signal is transmitted from the node 35-1 and circulates once in the counterclockwise direction in the loop. Part of the amount of the signal of the wavelength $\lambda_1$ is taken in by the addressed nodes 35-2 and 35-3, and the remaining portion is amplified to be transmitted to the transmission line. The receiving is performed by transmitting the signal taken in the node through the tunable filter 31, and hence the nodes 35-2 and 35-3 can respectively receive the signal carried by the light having the wavelength $\lambda_1$.

Figure 5:
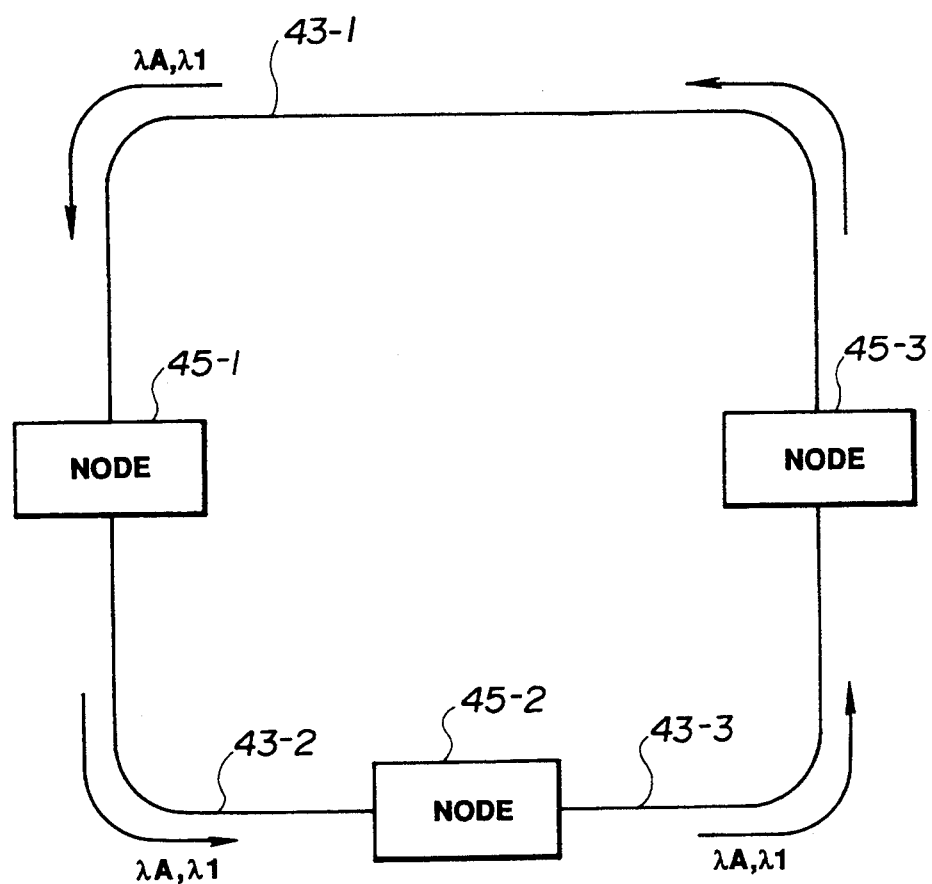
FIG. 5 is a schematic view showing the system structure of a second embodiment of a loop type optical LAN using the node shown in FIG. 3.

FIG. 5 shows a block diagram of a second embodiment of a loop type optical LAN using a node. In this embodiment, there is no node for performing the management and control of the WDM communication, and instead each node has such a function. FIG. 5 illustrates a case where a node 45-1 conducts the transmission at a wavelength $\lambda_1$. The structure of the node itself is basically the same as the node of the first embodiment.

An example of the management and control system of the WDM communication will be described. In this system, a table for storing the use state of wavelengths $\lambda_1 \sim \lambda_n$ to be used in the WDM communication is provided in the access processing circuit 27 of each node. Each node determines the wavelength to be used based on the memory stored in the table in this node. For simplicity of explanation, it is assumed that the node 45-1 transmits a signal at the wavelength $\lambda_1$.

The access processing circuit 27 in the node 45-1 confirms in its own table that the wavelength $\lambda_1$ is not used, and after that, stores in the table a memory that the user of the wavelength $\lambda_1$ is the node 45-1. Then the node 45-1 notifies the other nodes of the fact that the node 45-1 uses the wavelength $\lambda_1$, using the TDM communication. The access processing circuit 27 of the notified nodes 45-2 and 45-3 stores therein the fact that the node 45-1 uses the wavelength $\lambda_1$. When the transmission using the wavelength $\lambda_1$ is terminated, the node 45-1 notifies the other nodes of the fact that the node 45-1 has finished the use of the wavelength $\lambda_1$, using the TDM communication, and stores in its own table the fact that the wavelength $\lambda_1$ is not used. The access processing circuits 27 of the notified nodes 45-2 and 45-3 respectively store in their tables the fact that the wavelength $\lambda_1$ is not used. In this system, the WDM communication is not yet used when the system is initiated. Therefore, the fact that all wavelengths are not used is stored in the table of the access processing circuit 27 in each node.

The second embodiment of the loop type optical LAN is different from the first embodiment thereof only in that the management and control of the WDM communication is performed in a decentralized manner and not in a centralized manner. Methods of basic transmission and receiving are the same as the first embodiment.

Figure 6:
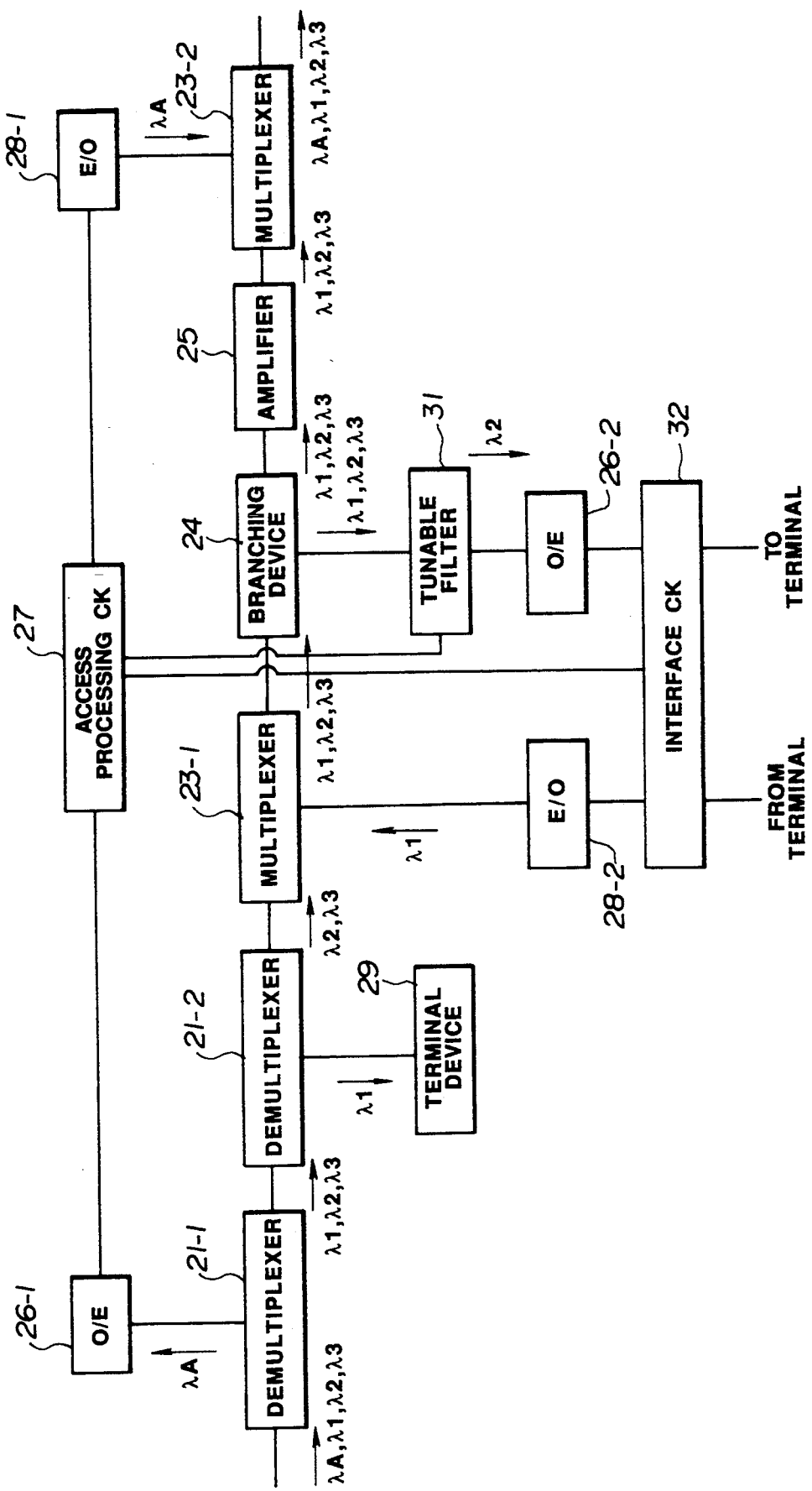
FIG. 6 is a block diagram showing the structure of a second embodiment of a node for a loop type optical LAN according to the present invention.

FIG. 6 shows the structure of a second embodiment of a node for a loop type optical LAN according to the present invention. In this embodiment, wavelengths to be used in the WDM communication are respectively assigned to respective nodes in advance, and an E/O converter 28-2 and an optical demultiplexer 21-2 in which wavelengths are fixed are used in each node for the WDM communication, in place of the tunable E/O converter and the tunable optical demultiplexer. The second embodiment of the node is different from the first embodiment of the node shown in FIG. 3 in those points. Namely, the wavelengths $\lambda_1$, $\lambda_2$ and $\lambda_3$ are set in advance for the respective nodes 35-1 (or 45-1), 35-2 (or 45-2) and 35-3 (or 45-3). The second embodiment of the node can be applied to either system structure of LAN with the control node (FIG. 4) or without the control node (see FIG. 5).

In FIG. 6, the same reference numerals as in FIG. 3 designate the same portions or elements as those shown in FIG. 3.

In this embodiment, after notifying the addressed node of the fact that the transmission will be started using the TDM communication, each node can freely start the transmission by using the wavelength assigned to this node. The addressed node receives this notice, and then the tunable filter 31 in this node is adjusted to the wavelength to be transmitted.

In the structure of the above discussed embodiments of the node, the positional relation among the optical multiplexer, the optical branching device and the optical amplifier along an optical signal transmission direction is not limited to those shown in FIGS. 3 and 6. The optical amplifier 25 is dispensable if the amount of light over the receiving sensitivity of the O/E converter 26-2 is maintained in all the nodes in the system. The number of the nodes in LAN and the wavelength multiplicity of the wavelength division multiplexing communication are not limited to three, respectively.

In the above embodiments, the time division multiplexing communication is compounded for the control of the wavelength division multiplexing communication by the wavelength division multiplexing to construct a loop type optical LAN, but other control communication systems can be used. For example, a coaxial cable may be used as a transmission line together with an optical fiber.

As has been described in the foregoing, in a loop type optical LAN using wavelength division multiplexing according to the present invention, at the time of transmission, when a wavelength transmitted from a node is circulated once in the loop and returns to this node, the entire amount of light of this wavelength is picked out of a transmission line, and at the time of receiving, a received wavelength is extracted from a signal light partially branched from the transmission line. Thus, a simultaneous communication is enabled.

The individual components shown in outline or designated by blocks in the Drawings are all well-known in the optical communication arts and optical semiconductor device arts and their specific construction and operation are not critical to the operation or best mode for carrying out the invention.

While there have been shown and described what are considered preferred embodiments of the present invention, it will be understood to those skilled in the art that various changes and modifications may be made therein without departing from the invention as defined by the following claims.

What is claimed is:

1. A node for a loop type optical LAN using wavelength division multiplexing, said node comprising:
light source means for transmitting light including a signal having a wavelength to a loop of the optical LAN;
an optical demultiplexer for selecting from the loop light having a same wavelength as the signal transmitted by said light source means; and
absorbing means for absorbing an entire amount of the signal transmitted by said light source means after the signal circulates the loop of the optical LAN once and then is selected by said optical demultiplexer,
further comprising light branching means for partially branching light from the loop and a tunable filter for filtering a signal having a desired wavelength from the light branched by said branching means, wherein remaining light not branched by said branching means is transmitted to the loop.

2. A node according to claim 1, further comprising control means for controlling a filtering wavelength of said tunable filter.

3. A node according to claim 1, further comprising an optical amplifier for amplifying light transmitted through the loop.

4. A node according to claim 1, wherein said light source means comprises a tunable light source and said optical demultiplexer comprises a tunable demultiplexer.

5. A node according to claim 4, further comprising control means for controlling an emitting wavelength of said tunable light source and a demultiplexing wavelength of said tunable demultiplexer.

6. A node according to claim 1, wherein said light source means comprises a wavelength-fixed light source and said optical demultiplexer comprises a wavelength-fixed demultiplexer.

7. A loop type optical LAN using wavelength division multiplexing, said LAN comprising:
a loop transmission line; and
a plurality of nodes, at least one of said nodes comprising light source means for transmitting light including a signal having a wavelength to said loop transmission line, an optical demultiplexer for selecting from said loop transmission line light having a same wavelength as the signal transmitted by said light source means and absorbing means for absorbing an entire amount of the signal transmitted by said light source means after the signal circulates the loop transmission line once and is then selected by said optical demultiplexer,
wherein said node further comprises light branching means for partially branching light from said loop transmission line and a tunable filter for filtering a signal having a desired wavelength from the light branched by said branching means, wherein remaining light not branched by said branching means is transmitted to said loop transmission line.

8. A LAN according to claim 7, wherein said node further comprises control means for controlling a filtering wavelength of said tunable filter.

9. A LAN according to claim 7, wherein said node further comprises an optical amplifier for amplifying light transmitted through said loop transmission line.

10. A LAN according to claim 7, wherein said light source means comprises a tunable light source and said optical demultiplexer comprises a tunable demultiplexer.

11. A LAN according to claim 10, wherein said node further comprises control means for controlling an emitting wavelength of said tunable light source and a demultiplexing wavelength of said tunable demultiplexer.

12. A LAN according to claim 7, wherein said light source means comprises a wavelength-fixed light source and said optical demultiplexer comprises a wavelength-fixed demultiplexer.

13. A LAN according to claim 8, wherein said control means operates in time division multiplexing communication compounded to a wavelength division multiplexing data communication by wavelength division multiplexing.

14. A LAN according to claim 11, wherein said control means operates in time division multiplexing communication compounded to a wavelength division multiplexing data communication by wavelength division multiplexing.

* * * * *

UNITED STATES PATENT AND TRADEMARK OFFICE
CERTIFICATE OF CORRECTION

PATENT NO. : 5,369,515
DATED : November 29, 1994
INVENTOR(S) : Majima

It is certified that error appears in the above-indentified patent and that said Letters Patent is hereby corrected as shown below:

COLUMN 1:

Line 42, "1~13~4" should read --1~13-4--.

Signed and Sealed this

Sixteenth Day of May, 1995

Attest:

BRUCE LEHMAN

Attesting Officer

Commissioner of Patents and Trademarks